（12）United States Patent
Russell et al.

(10) Patent No.: US 12,408,097 B1
(45) Date of Patent: *Sep. 2, 2025

(54) ULTRA-HIGH RELIABILITY WIRELESS COMMUNICATION SYSTEMS AND METHODS WITH JAMMING DETECTION

(71) Applicant: National Technology & Engineering Solutions of Sandia, LLC, Albuquerque, NM (US)

(72) Inventors: John L. Russell, Albuquerque, NM (US); David A. Wiegandt, Albuquerque, NM (US); Dahlon D. Chu, Albuquerque, NM (US); Kevin Robbins, Albuquerque, NM (US); Douglas G. Brown, Harvest, AL (US); Dominic A. Perea, Placitas, NM (US); Loren E. Riblett, Jr., Edgewood, NM (US); Glen I. Magee, Albuquerque, NM (US); Wesley Hutchins, Albuquerque, NM (US); Tad Ashlock, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 282 days.

This patent is subject to a terminal disclaimer.

(21) Appl. No.: 18/086,807

(22) Filed: Dec. 22, 2022

Related U.S. Application Data

(63) Continuation-in-part of application No. 17/201,130, filed on Mar. 15, 2021, now Pat. No. 11,540,198,
(Continued)

(51) Int. Cl.
*H04J 3/14* (2006.01)
*H04L 45/12* (2022.01)
(Continued)

(52) U.S. Cl.
CPC ............. *H04W 40/16* (2013.01); *H04L 45/12* (2013.01); *H04W 4/02* (2013.01); *H04W 48/18* (2013.01); *H04W 84/18* (2013.01)

(58) Field of Classification Search
CPC ....... H04W 40/16; H04W 4/02; H04W 48/18; H04W 84/18; H04L 45/12
(Continued)

(56) References Cited

U.S. PATENT DOCUMENTS 10,952,123 B1 * 3/2021 Russell .................. H04L 45/12
11,540,198 B2 * 12/2022 Russell .................. H04W 4/02
(Continued)

OTHER PUBLICATIONS

Available Indication as key enabler for Ultra reliable communication in 5G, European Conference on network, and communications (Year 2014 ) (Year: 2014).*
(Continued)

*Primary Examiner* — Chuong T Ho
(74) *Attorney, Agent, or Firm* — Daniel J. Jenkins; Kenneth Paul McNeill

(57) ABSTRACT

Systems and methods for ultra-high reliability (UHR) wireless communications systems and methods are disclosed. The disclosed UHR wireless communications systems and methods make the networked components on a communications infrastructure robust to interference caused by unintentional jamming, intermittent connectivity, weather, and physical barriers and additionally detect communications jamming.

16 Claims, 5 Drawing Sheets

Related U.S. Application Data which is a continuation of application No. 15/222,699, filed on Jul. 28, 2016, now Pat. No. 10,952,123.

(60) Provisional application No. 62/197,860, filed on Jul. 28, 2015.

(51) Int. Cl.
  *H04W 4/02* (2018.01)
  *H04W 40/16* (2009.01)
  *H04W 48/18* (2009.01)
  *H04W 84/18* (2009.01)

(58) Field of Classification Search
  USPC .......................................................... 370/230
  See application file for complete search history.

(56) References Cited

U.S. PATENT DOCUMENTS

| | | | |
|---|---|---|---|
| 2002/0103877 | A1 | 8/2002 | Gagnon |
| 2007/0054671 | A1* | 3/2007 | Meyers ................ H04W 72/52 455/423 |
| 2007/0155395 | A1* | 7/2007 | Gopalakrishnan .... H04W 28/18 455/453 |
| 2010/0246480 | A1 | 9/2010 | Aggarwal et al. |
| 2011/0164518 | A1* | 7/2011 | Daraiseh ................ H04L 45/121 370/252 |
| 2013/0107726 | A1 | 5/2013 | Hughes et al. |
| 2013/0273839 | A1* | 10/2013 | Breshears ............... H04L 45/04 455/11.1 |
| 2013/0329648 | A1 | 12/2013 | Lord |
| 2014/0016468 | A1 | 1/2014 | Daraiseh et al. |
| 2014/0100781 | A1 | 4/2014 | Venkatraman |
| 2014/0129735 | A1* | 5/2014 | Thyni ................... H04L 45/124 709/241 |
| 2014/0180779 | A1 | 6/2014 | Stewart et al. |
| 2014/0193077 | A1 | 7/2014 | Shiiyama et al. |
| 2014/0349568 | A1* | 11/2014 | Niemela .................. H04K 3/22 455/1 |
| 2015/0365792 | A1 | 12/2015 | Manges |
| 2016/0262041 | A1 | 9/2016 | Ronneke et al. |
| 2017/0032670 | A1 | 2/2017 | Poornachandran |
| 2024/0369680 | A1* | 11/2024 | Mouille .................. H04K 3/45 |

OTHER PUBLICATIONS

Schotten, H. D. et al., "Availability Indication as Key Enabler for Ultra-Reliable Communication in 5G," European Conference on Networks and Communications (2014) 5 pages, Bologna.

\* cited by examiner

ULTRA-HIGH RELIABILITY WIRELESS COMMUNICATION SYSTEMS AND METHODS WITH JAMMING DETECTION

CROSS-REFERENCE TO RELATED APPLICATIONS

This application is a Continuation-in-Part and claims priority to U.S. Non-Provisional patent application Ser. No. 17/201,130, filed on Mar. 15, 2021, entitled ULTRA-HIGH RELIABILITY WIRELESS COMMUNICATION SYSTEMS AND METHODS, which is a Continuation of and claims priority to U.S. Non-Provisional patent application Ser. No. 15/222,699, filed on Jul. 28, 2016, entitled ULTRA-HIGH RELIABILITY WIRELESS COMMUNICATION SYSTEMS AND METHODS, now U.S. Pat. No. 10,952,123, which claims priority to U.S. Provisional Patent Application No. 62/197,860, filed on Jul. 28, 2015, entitled "ULTRA-HIGH RELIABILITY WIRELESS COMMUNICATION SYSTEMS AND METHODS", the entireties of which are incorporated herein by reference.

GOVERNMENT RIGHTS

The Government has rights to this invention pursuant to Contract No. DE-AC04-94AL85000 awarded by the U.S. Department of Energy and under Contract No. DE-NA0003525 awarded by the United States Department of Energy/National Nuclear Security Administration. The U.S. Government has certain rights in this invention.

FIELD

The invention relates generally to wireless networking, and more particularly to ultra-high reliability wireless communication systems and methods that use multiple physical layers to ensure robust data throughput and are capable of jamming detection.

BACKGROUND OF THE INVENTION

The wireless environment is dynamic and unpredictable with complications due to environment and weather, unintentional jamming, and even intentional jamming. Possible solutions to such complications are constrained by existing applications and networking technologies.

The need of ultra-high reliability wireless communications (comms) exists in applications such as high security applications or critical emergency operations. These applications demand reliable communications when subjected to unintentional jamming from harsh weather, commercial communications infrastructure failure or unavailability due to power outages or saturated RF environments around large groups of people with mobile RF transmitters (i.e.) phones around/in stadiums and along crowded event pathways, or poor frequency coordination between law enforcement operations from different agencies and intentional jamming from malicious actors that intend to undermine high security operations or emergency activities.

A need remains, therefore, for wireless networking systems and methods that are robust to such complications and transparent to existing applications and networking technologies.

SUMMARY OF THE INVENTION

The present disclosure is directed to ultra-high reliability wireless (UHRW) communications systems and methods that can detect communication jammers and provide jamming alarms and/or determine estimated jammer locations. The disclosed UHRW communications systems and methods use a plurality of information propagating physics, communication systems and nodes that route communications to make the networked components on a communications infrastructure robust to interference caused by unintentional jamming, intermittent connectivity, weather, and physical barriers.

The disclosure implements a robust and secure networking topology, scalable to many nodes and applications, that actively manages multiple heterogeneous physical layers and the resources that are connected to these layers to ensure uninterrupted connectivity among nodes and applications via one or more unaffected physical layers.

In an embodiment of the disclosure, a communications system is disclosed that includes two or more communication nodes in communication with one another, at least one information source providing information to at least one of the two or more communication nodes, and at least one client network in communication with at least one node of the two or more nodes. The two or more nodes comprise a processor configured to select one or more communication devices to communicate information received from the at least one information source based on a determination of the reliability of communications between the two or more nodes. The system further includes a control module. One or more of the two or more communication nodes is configured to detect a jamming source.

In another embodiment of the disclosure, a communications method is disclosed that includes receiving information into one or more communication nodes, determining at the receiving node the most reliable communication path passing through at least one additional node of the one or more communication nodes to a client network, transmitting the information from the one or more nodes having received the information through the most reliable communication path, and receiving the information at the client network. In addition, the communication pathway between the nodes may be selected based on energy efficiency, latency, data rates, state of health data, and other measures and metrics relevant to a particular transmission parameter. The method includes detecting communications jamming.

One advantage of the present disclosure is providing robust and highly jam resistant communication systems and methods.

Another advantage of the present disclosure is providing highly jam resistant communications systems and methods.

Another advantage of the present disclosure is providing communications systems and methods that provides an alarm when jamming is present.

Another advantage of the present disclosure is providing communications systems and methods that estimate jammer location.

Additional advantages of the present disclosure include, but are not limited to:

a. backwards compatibility with existing networking technologies and applications;
b. support for layer 2 (e.g., Ethernet radios) and layer 3 (e.g., IP packet radios) physical layers;
c. support for transparently upgrading physical layers after initial deployment and service;
d. support for both fixed and mobile ad-hoc network deployments, support for satellite communications both for remote command and status of communication nodes and for communication among nodes; and
e. detection and reporting of jamming scenarios.

DETAILED DESCRIPTION OF THE INVENTION

The present disclosure is directed to ultra-high reliability wireless (UHRW) communications systems and methods that use a plurality of nodes, various communication systems and information propagating physics that route communications to make the networked components on a communications infrastructure robust to interference caused by unintentional jamming, intermittent connectivity, weather, and physical barriers. Information propagating physics meaning the modulated energy phenomenology that allows propagation of information from a transmitter to one of more receivers.

Processors at each node manage data over multiple concurrent links. This robust architecture eliminates data dropout due to a single or multiple link failure. The system employs a physical layer agnostic architecture allowing for any type of communication system to be integrated horizontally into the robust architecture. The architecture includes jammer detection and location protocols, methodology and capability. The communication system to be integrated into one or more of the nodes may include, but are not limited to radio frequency (RF) communications across multiple frequency bands, optical communications, and acoustic systems, and combinations thereof. These examples do not preclude the inclusion of other phenomenologies used as a physical layer for communications. RF communications are communications or transmissions that are wireless electromagnetic signals that are modulated to encode and propagate information from a transmitter to one or more receivers, such as low and high frequency radios. Optical communications are optical signals that are modulated to encode and propagate information from a transmitter to one of more receivers. An example of optical communications include infrared radios that transmit modulate infrared light sources to propagate information from a transmitter to one or more receivers. Acoustic communication systems are transmitted modulated acoustic signals created by sequences of pressure variations that propagate through air, water, soil, or other solid and received by one or more receivers. An example of an acoustic communication system is the underwater communications systems used be underwater divers.

Figure 1:
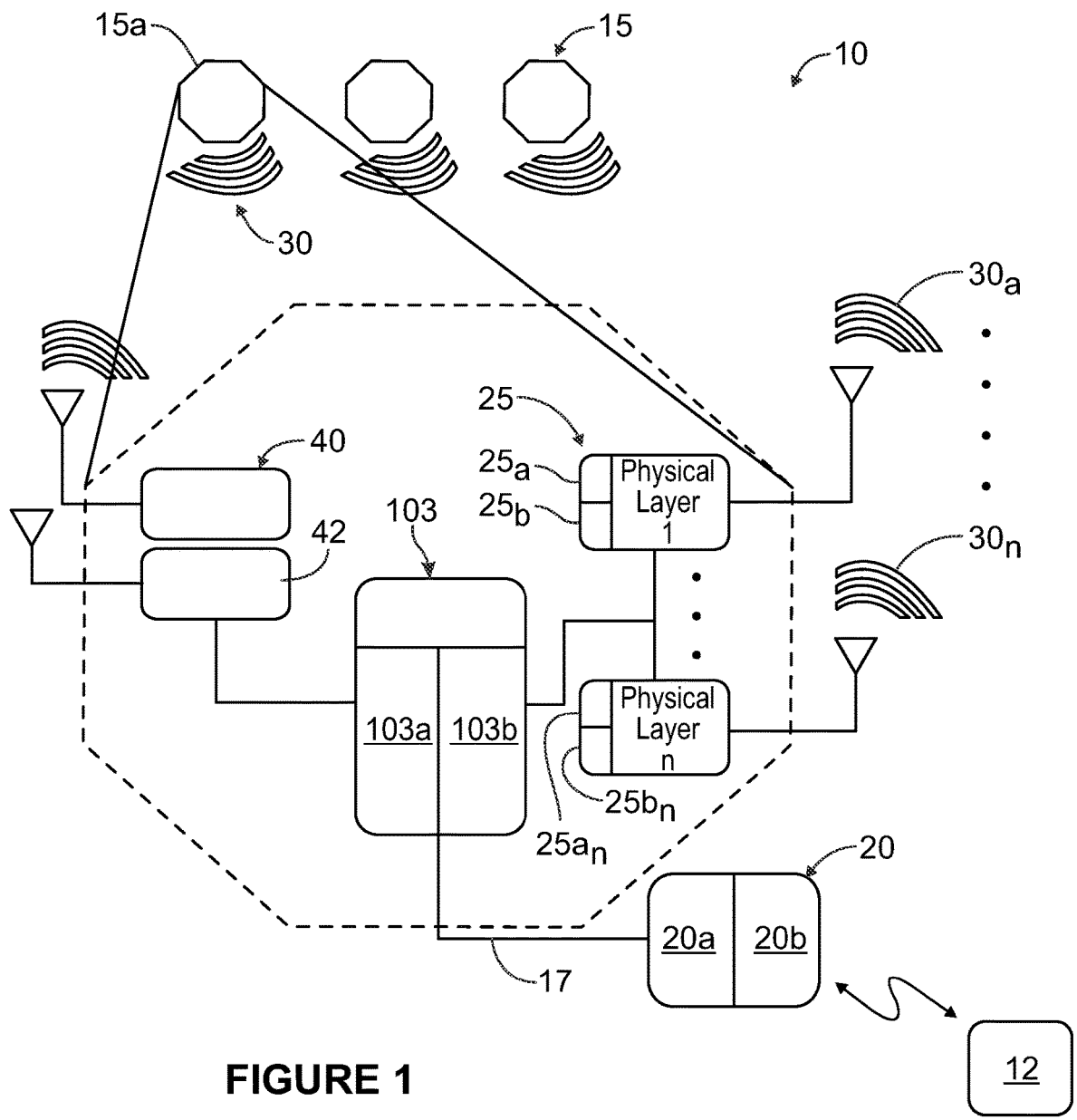
FIG. 1 illustrates an example of a communications system according to an embodiment of the disclosure.

FIG. 1 illustrates an example of an (UHRW) communications system (system) according to an embodiment of the disclosure. The system 10 is used to communicate information or data, referred to herein as information, to a system input user or providers 12, such as a user or operator. As can be seen in FIG. 1, the system 10 includes nodes 15 and a control system 20. In this exemplary embodiment, the nodes 15 includes three nodes 15a, however, in other embodiments, the nodes 15 may be one or more nodes. In other embodiments, the nodes 15 may have 10 or more nodes. It is appreciated that the number of nodes is scalable and upwardly limited only by the limitations of the integrated physical layers. In this exemplary embodiment, the nodes 15 are geographically fixed or stationary. In other embodiments, the nodes 15 may be stationary or mobile. For example, mobile nodes may be located on mobile platforms, such as, but not limited to vehicles, individuals, or unmanned vehicles. The nodes 15 provide for selective routing of information between the nodes 15 and between the control system 20 and the nodes. In other embodiments, one or more nodes 15 may also communicate (send or receive data/information) with other sources, such as, but not limited to GPS systems and mapping systems.

The control system 20 allows for system input providers 12 to provide inputs to the nodes 15. The inputs may include operator instructions such as, but not limited to target information, node sensor updates, imager updates, state of health messages, operational updates, software updates, location/location path instructions, and external inputs/updates. The inputs may also include external source inputs, such as, but not limited to GPS data, weather data/updates.

In addition, the control system 20 receives data from the nodes and provides that data to one or more system input providers 12 such as an operator/user, an alarm monitoring station or an emergency operations center. In an embodiment, the control system 20 may also include data storage. The control system 20 includes a control module 20a and a client network 20b. The client network 20b provides communication links, routers, transmitters for communications between the control system 20 and the nodes 15 and the system providers 12. The communication links may include wireless and wired links. The wireless links may include RF, optical, and acoustic links. The client network 20b includes a communications link (link) 17 that communicates information/date between the control module 20a and the nodes 15.

The control module 20a processes inputs from the nodes 15 and system providers 12 via the client network 20b and provides information via client network 20b to the nodes and system providers 12. The control module 20a processes inputs to generate instruction, commands and data with one or more computers and/or processors containing software with instructions suitable for processing the inputs. The control module 20a may also include memory and firmware for processing data.

In the exemplary embodiment shown in FIG. 1, the control module 20a provides information to node 15a. In other embodiments, the control module 20a may provide information to one or more nodes 15. The control module 20a may provide data from sources including, but not limited to sensor(s), cameras, command and control applications, voice communication sources, Private Branch Exchange (PBX) for telephony, and short message service (SMS) for texts from one or more system input providers 12. This list is not exhaustive and is simply representative of applications that can be used. The control module 20a can be any type of digital data provided by node 15. For example, the camera and sensor data may be, but is not limited to camera imaging systems, video analytics, and acoustic systems data.

In an embodiment, the control system 20 receives information from the nodes 15 through the client network 20b and provides that information to a system input provider 12, such as a user or operator. In this exemplary embodiment, the control system 20 is located at a control system location. In another embodiment, the control system 20 may be co-located or partially co-located with or at a component of a node. The client network 20b may interface or communicate with, be connected to, or be linked to the one or more of the nodes 15 by one or more fixed or mobile computer devices (devices) of the control module 20a over a communication link (link) 17. In this exemplary embodiment, the link 17 is to one node 15a, however in other embodiments, the link may be between one or more control systems 20 and one or more nodes 15. The computer devices may be, but are not limited to, computer processors, laptops, mobile phones, computer tablets, managed switch networks or other networking devices. The link 17 may be a wireless and/or wired connection. In an embodiment, the client network 20b may be locally connected to and/or co-located with the nodes 15. In an embodiment, the link 17 may be a wireless connection such as, but is not limited to WIFI, LIFI, Bluetooth, Ultra-Wide Band, and/or broadband wireless. In an embodiment, the link 17 may be a wired connection, such as, but not limited to Ethernet. In an embodiment, the client network 20b may provide the communicated information received from the node 15a over link 17, in original or processed format, to an external input provider 12, such as a user.

In other embodiments, one or more of the nodes 15 may not be linked to the control system 20 but may be used solely as an information routing between nodes 15 and/or between the nodes 15 and the control system 20 and user 12. In other embodiments, the application 20 may not include the control module 20a or client network 20b, thereby serving as either an information receiver or information provider, respectively.

As discussed above, the control system 20 is linked only to node 15a. In other embodiments, application 20 may be linked to one or more of nodes 15. In yet other embodiments, one or more control systems 20 may be linked to one or more of nodes 15. In yet other embodiments, one or more nodes of nodes 15 may be connected to one or more other and/or the same control systems, with control systems communicating among/between themselves. In an embodiment, control system 20 may communicate to another control system over the node communications network, over a communications link independent of the node communications network, or combinations thereof.

According to the present disclosure, one or more nodes 15 provides a message/data to the user 12 via client network 20b identifying which radio(s) is suffering from indications of jamming in the form of an alarm condition and associated supporting data. In yet another embodiment, the one or more nodes 15 may provide the message to the control module 20a that may analyze the message/data to further process the message/data before being provided to the user 12. For example, the control module may process the message data to determine if the message/data is a false alarm.

The control system 20 provides continuous state of health messages to the user 12 indicating reliable communications is being provided by unaffected radios. The control system further may provide the location of the jamming source to the user, allowing the user to take the necessary actions to deconflict communications or other response deemed appropriate.

FIG. 1 also illustrates a more detailed view of node 15a according to an embodiment of the disclosure. As can be seen in FIG. 1, node 15a includes a node command module 103 that includes a processor 103a and a network switching layer 103b. The processor 103a actively manages a plurality (1–n) of communication physical layers 25 (physical layers) to robustly communicate among the plurality of nodes 15 even in the presence of jamming or the loss of any one the plurality of physical layers, whether intentional or unintentional. The processor 103 actively manages the physical layers 25 by selecting one or more of the physical layers 25 to communicate information to or from that node to another node. In an embodiment, the processor 103a may use a GNU/Linux operating system. In another embodiment, the processor 103a may use another operating system, such as, but not limited to Windows, OS X, and FreeBSD. As can be appreciated, the network switching layer 103b is not limited to any number of physical n layers, but can transparently manage as many physical layers as are needed for a given application. The physical layers 25 communicate over associated communication pathways 30a through 30n.

The processor 103a uses out-of-band (OOB) information to determine to which node, if necessary, information is communicated to reach the application 20 in the most reliable and efficient (collectively referred to as "reliable") pathway or route. In addition, the process may have access to and use in-band data, the actual data the user is expecting to receive, for example the sensor data or image data. The OOB data is used to identify the best transmission path for the in-band data. As used herein, the term "reliable" means maintaining the ability to communicate despite environmental challenges such as, but not limited to, weather fading, unintentional jamming, and intentional jamming. In another embodiment, the processor 103a may use and/or include energy efficiency, latency, packets lost, and other measures and metrics relevant to the communications parameters to determine the pathway. In such a manner, by using a plurality of nodes 15, the system 10 can determine or ascertain the most reliable route and physical layer to communicate the information between the nodes 15 and to, in an embodiment, to the application 20 and user 12. The OOB information is determined by and/or available to the processor 103 during operations by analyzing communications or by using predetermined communications parameters.

The OOB information can include, but is not limited to received signal strength indication (RSSI), link quality, lost packets, and data rates. In an embodiment, the processor 103a determines OOB information by sampling communications or by sending test communications packets and analyzing the communication. In addition to the OOB information discussed above, the OOB information can include, but is not limited to routing tables, routing metrics, and default window size for transmission control protocol (TCP) connections over routes, that are available to the processor 103a via processor memory. The processor 103a uses an algorithm that provides for the execution of computer executable instructions to select the communications route and physical layer based on reliability metrics and indications of jamming of one or more physical layers.

The switching layer 103*b* receives instructions from the processor 103*a* as to which one or more physical layers 25 to select for communications. The switching layer 103*b* implements the separation of the various physical layers, each of which realizes a network segment, and ensures communications from the processor 103*a* are transmitted on the desired physical layers. The switching layer 103*b* may be implemented by various means including, but not limited to, (a) a discrete VLAN switch connected to the processor 103*a* by a single physical network interface and (b) multiple physical network interfaces directly integrated to the processor 103*a*.

The physical layers 25 are communications systems that allow for node-to-node communications. The communications systems may be, but are not limited to radio frequency (RF) communications across multiple frequency bands, Ultra-Wide Band, optical communications, Ultra-Violet Communications, acoustic systems, satellite comms, Bluetooth, WiFi, LiFi, power line modem, and combinations thereof. The physical layers 25 form a "coded network" and may include a link layer device(s) 25*a* and/or network layer device(s) 25*b*. Link layer devices 25*a* implement a single network segment for all participating comm devices. In an embodiment, the link layer devices 25*a* may be, but are not limited to Ethernet radios and layer 3 packet radios. In an embodiment, the link layer radio may be an Ethernet radio, such as, but not limited to an AvaLAN radio or the Torrey Pines Logic IR Optical radio. Network layer devices 25*b* permit the use of routing packets between separate networks. The network layer devices 25*b* may be, but are not limited to, IP packet radios such as, but not limited to, a Motorola MOTO Mesh radio.

In an embodiment, node 15*a* may further include a management interface system 40 to provide additional information or access to the processor 103*a*. The management interface system 40 provides access to the processor of the node to configure, upgrade, command, or query a node. For example, access can be used to provide diagnostic access and/or monitoring of the system 10, and/or to provide updates to the processor 103*a*. In this exemplary embodiment, the management interface system 40 is a wireless physical layer, permitting the node to be located where direct physical access is inconvenient or impossible. In an embodiment, the wireless physical layer may be a radio. In an embodiment, the radio may be a mesh radio, point to multi-point, or point to point. In another embodiment, the radio may be a satellite modem that permits remote command and status of nodes 15 and may also provide for communication between the nodes 15.

In an embodiment, node 15*a* may also further include an optional node service system 42 that may provide information to the node 15*a*, such as, but not limited to time synchronization, positioning, and environmental monitoring (e.g., rain gauge, and barometric pressure). In this exemplary embodiment, the optional node service system 42 is a global positioning system (GPS) providing geolocation of the node 15*a* and timing information to the processor 103.

In another embodiment of the disclosure, the system 10 is configured to detect jamming scenarios and report these conditions and/or provide an alarm to the user 12. In this embodiment, the any one or more of the nodes 15, control system 20 and/or user 12 may include an alarm or other notification system to present jamming detection information, as well as capabilities as discussed above. This capability is configured in two embodiments. In a first embodiment, the processor 103*a* and associated switching layer 103*b* simultaneously monitors performance of all communication physical layers 25 in real time using one of two methods. In this embodiment, the physical layers 25 have a built-in state of health (SOH) capability, reporting the strength and stability of existing connections to the processor 103*a*. For physical layers 25 that lack built in monitoring, each such node can send SOH test messages to continuously evaluate the state of existing links or connections and robustness to yield data similar to the metrics from built in link monitoring but at the command module 103. Whether this data is procured from device SOH or test messages via the nodes 15, the data is used to evaluate at the command module and/or at the node(s) the strength and stability of a connection and can determine if a known good link is being jammed either intentionally or unintentionally.

In a second embodiment, an active sensor that may be included in the node service system 42 that scans the RF spectrum over frequencies of interest detects a brute force energy jamming attack by continuously evaluating RF energy in a monitored channel. This data is fed to a networked monitoring resource such as a node processor 103*a* or a centralize monitoring location that is part of the control system 20 to evaluate the real-time monitoring data. When a jamming condition is detected by this monitoring capability, an alarm is sent to the alarm monitoring system in the control system 20, informing the alarm monitoring officer, a user 12, that a jamming condition exists.

In addition to detecting an alarm jamming condition, another embodiment of the disclosure is a multi-node direction finding capability to determine the location of the jamming source. FIGS. 2-7 illustrate the concepts used by the control system 20 to geolocate the jamming source use.

According to this embodiment, two or more nodes have a GPS coordinate associated with it that places it uniquely in a geographical area anywhere on the globe. These nodes may be referred to as DF nodes. Each of the GPS coordinates is a spherical vector of latitude and longitude on a unit sphere. The geolocation algorithm knows the distances between the DF nodes along with the angles between them and uses these GPS coordinate vectors to calculate this as reported by the DF nodes. The geolocation algorithm and/or jamming location algorithm may be included in part or in whole at one or more of the DF node processors and/or the application.

Figure 2:
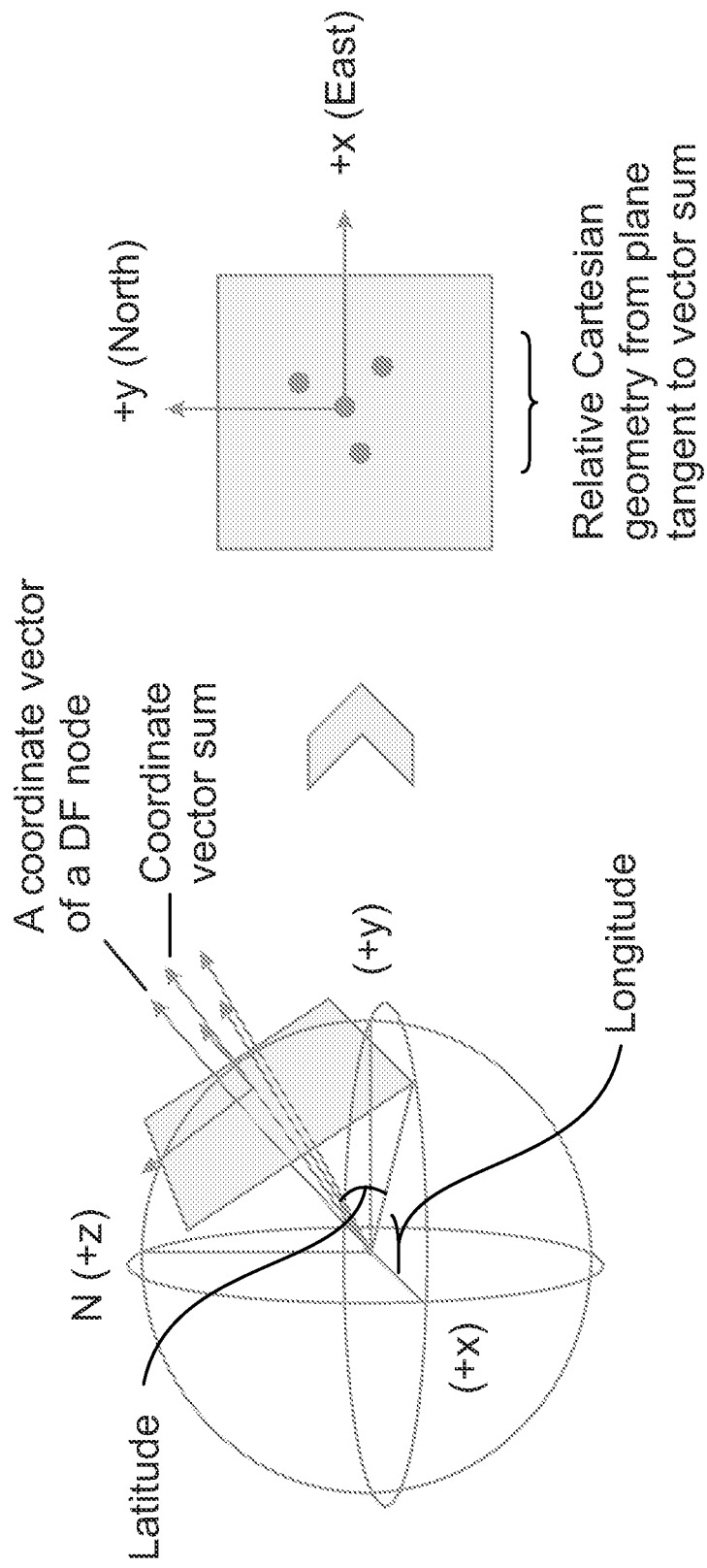
FIG. 2 is an illustration of the jamming source location algorithm mapping GPS latitude-longitude coordinates into Cartesian coordinates for local reference.

As seen in FIGS. 2, the algorithm maps these GPS latitude-longitude coordinates into Cartesian coordinates for local reference. As the radius of the earth varies, these angles map differently into surface distance depending on location. Assuming that the local area is flat, the angles can be intersected with a tangent plane to obtain the relative Cartesian geometry of a set of coordinates, and the distances and angles between each pair of DF nodes can be automatically calculated. This auto-generated geometry is calculated using only the GPS coordinates reported by each DF node and sets up the parameters required to calculate intersections using the power vectors generated by each DF node described below. Additional altitude information on the GPS coordinates can be used by the algorithm to further enhance accuracy of the relative distances between DF nodes since that information would remove the limitation of assuming a unit sphere. Relative angles calculation would not be affected by this.

Figure 3:
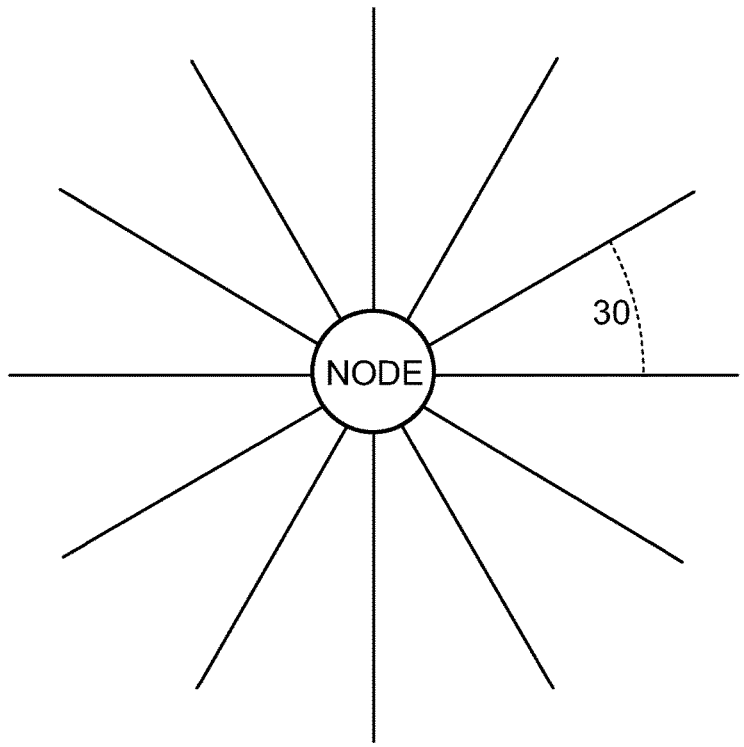
FIG. 3 shows a direction finding (DF) node consisting of twelve segmented antennas, each with a field of view of 30 degrees according to an embodiment of the disclosure.

FIG. 3 shows a DF node consisting of 12 segmented antennas, each with a field of view of 30 degrees according to an embodiment of the disclosure. In other embodiments, a DF node may have one omnidirectional antenna, which will require three or more DF nodes for unambiguous geolocation of the jamming source. In the 12 segmented antenna example, energy from a jamming source is received and binned in one of the 12 angular bins.

Figure 4:
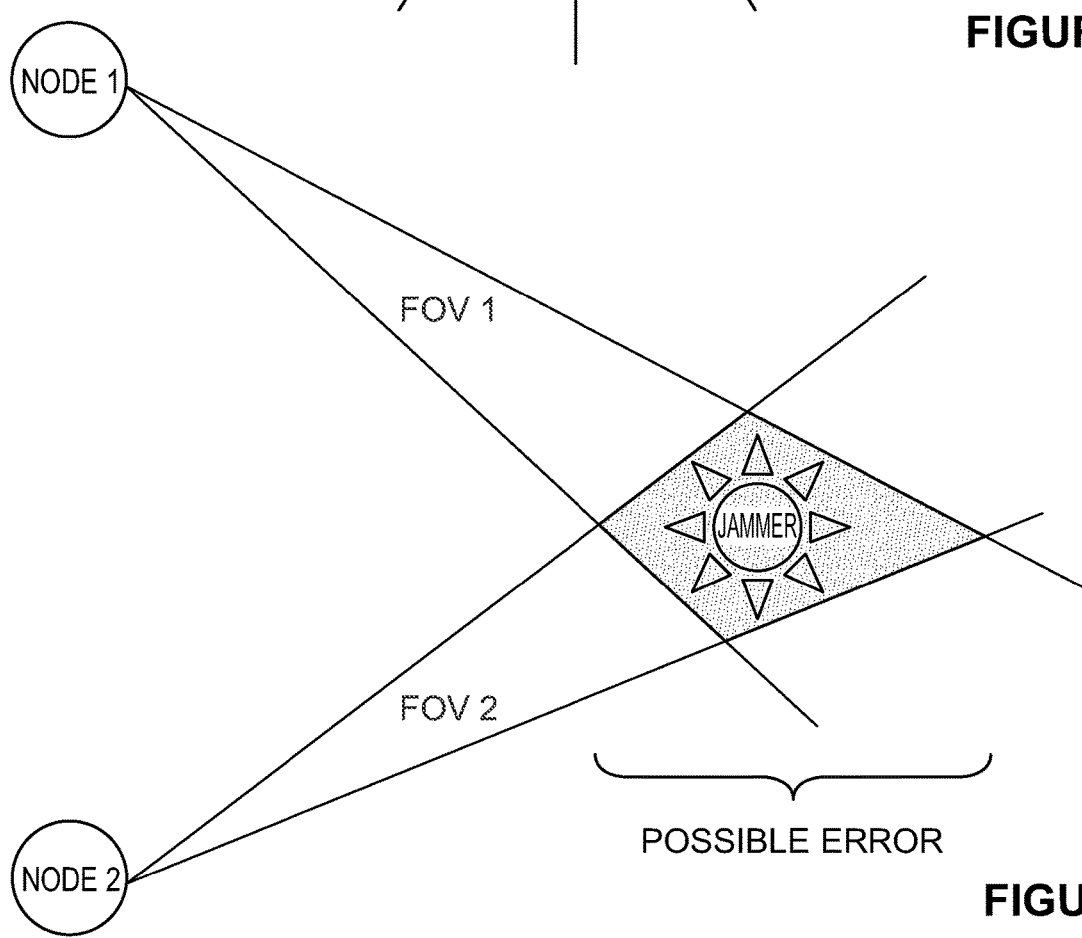
FIG. 4 shows two angular bins from adjacent nodes and the projected estimated area of the intersection estimated as indicated by the shaded area encompassing the Jammer with associated possible errors according to an embodiment of the disclosure.
Figure 5:
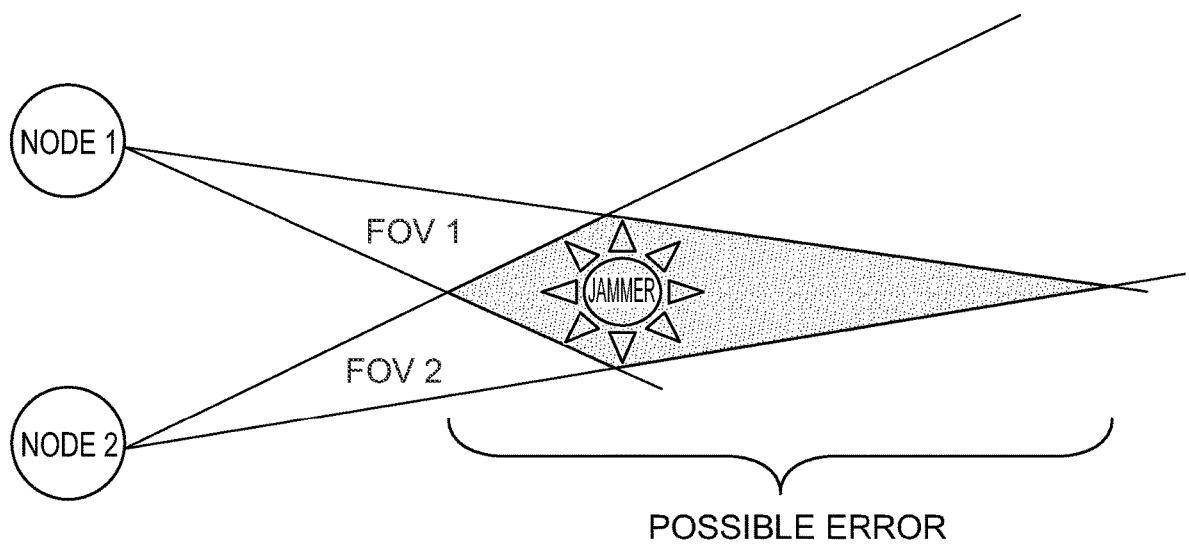
FIG. 5 shows two angular bins from adjacent nodes and the projected estimated area of the intersection estimated as indicated by the shaded area encompassing the Jammer with associated possible errors according to an embodiment of the disclosure.
Figure 6:
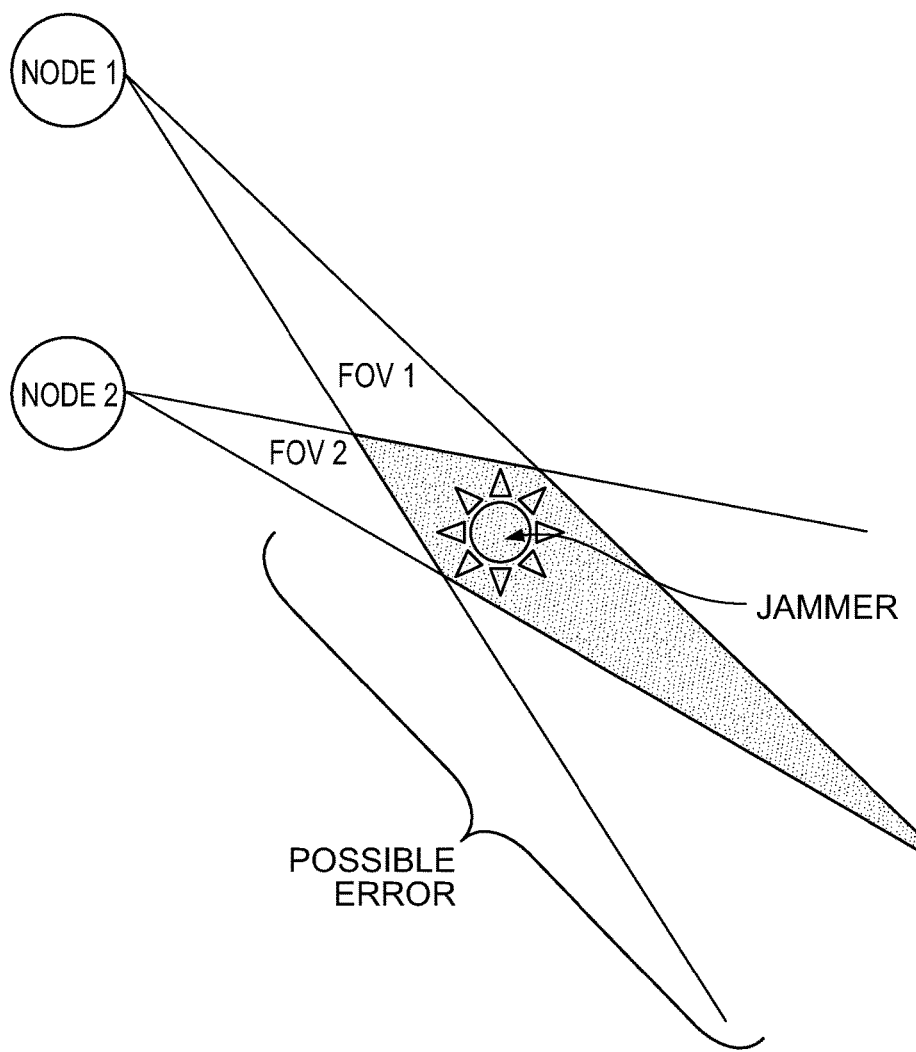
FIG. 6 shows two angular bins from adjacent nodes and the projected estimated area of the intersection estimated as indicated by the shaded area encompassing the Jammer with associated possible errors according to an embodiment of the disclosure.

FIGS. 4, 5 and 6 illustrate when two or more angular bins from adjacent nodes receive a jamming signal, the projected area of the intersection can be estimated as indicated by the shaded area encompassing the Jammer with associated possible errors. The smaller the angle of intersection created by the limits of each angular field of view, the more possible error that is realized in the location of the Jammer. This is illustrated by the bracket shown in each figure labeled "Possible Error". With multiple intersections, the estimated coordinates of the Jammer location must be averaged, but simple averaging can lead to inaccurate results.

To alleviate this, the intersections are weighted such that the intersection point is considered more heavily based on its reliability. One important consideration in reliability is the angle between DF nodes used to find the intersection. As the smaller of the two angles formed by the intersection lines decreases, more error in the distance can occur if the DF nodes form a small angle.

Figure 7:
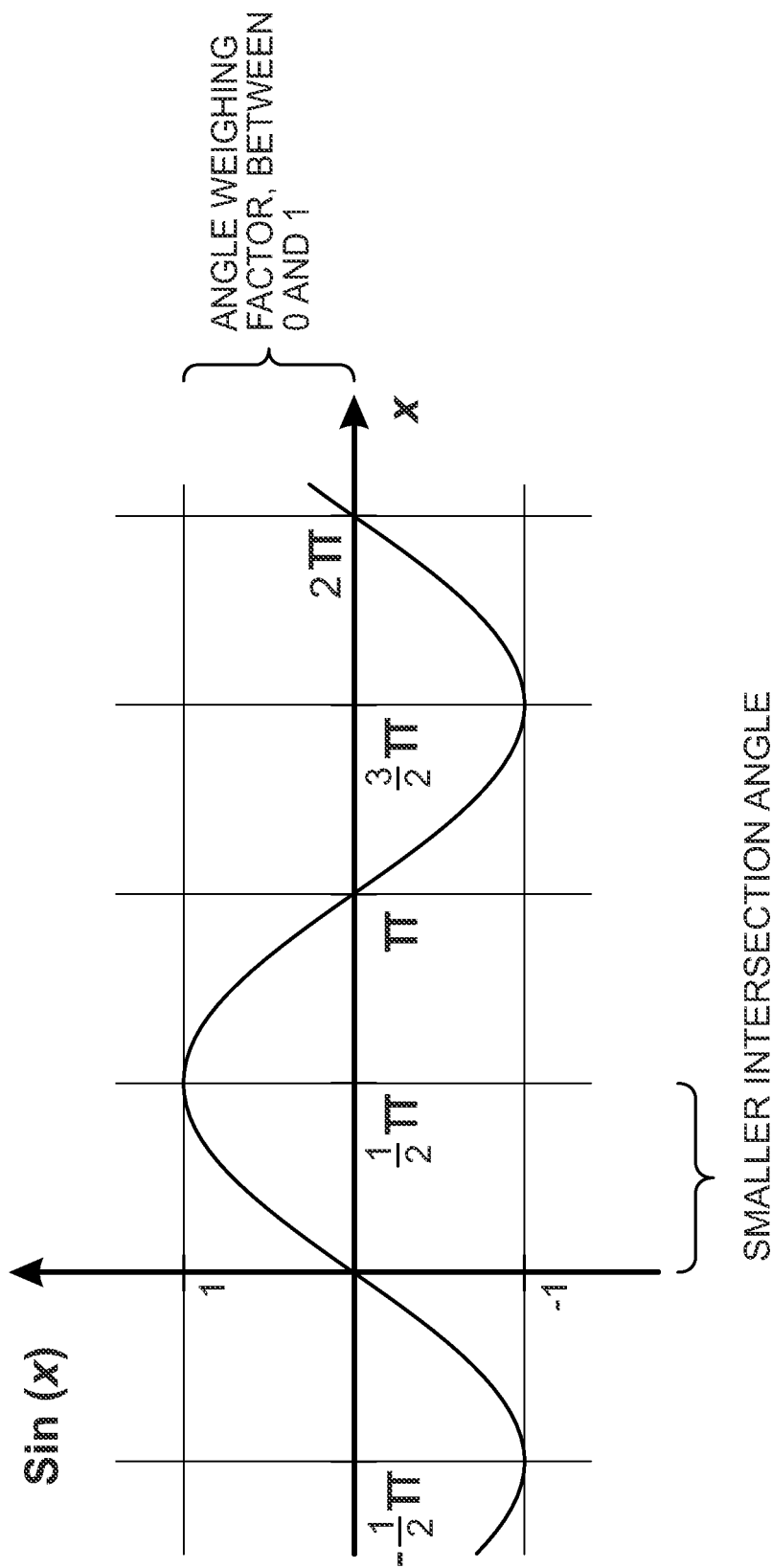
FIG. 7 shows a weighting factor model based on a sine function to produce a weighting factor for each intersection, that effectively reduces the location errors.

A weighting factor based on a sine function was chosen to produce a weighting factor for each intersection, as shown in FIG. 7. When the intersection angle is close to "zero", the weighting factor is very low, approximately "zero". When the intersection angle approaches pi/2 or 90 degrees the weighting factor approaches a value of "1". The weighting in cartesian coordinates is:

$$x_{weighted} = \frac{1}{\sum w_i} \sum_{i=1}^{n} x_i w_i$$

$$y_{weighted} = \frac{1}{\sum w_i} \sum_{i=1}^{n} y_i w_i$$

At each calculation time cycle, a set of coordinates is placed into a queue. A simple average of all coordinates in the queue is taken as the final answer. The queue provides stability to the location algorithm, allowing for more accurate geolocation estimates even for moving targets, but there is a tradeoff for latency. The algorithm determines where the source was some time in the past, rather than where the jamming sources are currently. The latency will be a function of the number of coordinates placed in the queue. To minimize the effects of the latency, the velocity and bearing of the jamming source for the last estimate and a predicted location can be used to estimate the next location. Asynchronous clustering is used to determine when a data point should be entered into the queue, recognizing that data from multiple nodes will arrive at different times, creating a data association problem that must include uncertainty in the jamming location and latency in the arrival of data from the geolocation nodes.

Using the above methods, alarm information sent to the monitoring system from UHRW includes which radio is being jammed, the location of the jamming source, and a state of health of other networked radios indicating that reliable communications still exists.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A communications system, comprising:
   two or more communication nodes in communication with one another;
   at least one information source providing information to at least one of the two or more communication nodes; and
   at least one client network in communication with at least one node of the two or more nodes;
   wherein the two or more communication nodes comprise two or more communication devices; and
   wherein the two or more nodes comprise a processor configured to select one or more of the two or more communication devices to communicate information received from the at least one information source based on a determination of the reliability of communications between the two or more nodes;
   a control module;
   wherein one or more of the two or more communication nodes is configured to detect a jamming source; and
   wherein the control module and/or two or more nodes determines a location of the jamming source based on the field of view of two or more nodes.

2. The communications system of claim 1, wherein each node comprises a plurality of segmented antennas; and wherein each individual segmented antenna is associated with the field of view for that individual node.

3. The communications system of claim 1, wherein the one or more communication devices are two or more communication devices.

4. The communications system of claim 3, wherein the two or more communications devices are different devices and are selected from a group consisting of radio frequency devices, acoustic communication devices and optical transmission devices.

5. The communications system of claim 1, wherein the information source is a sensor.

6. The communications system of claim 1, wherein the client network is selected from a group consisting of mobile communications devices, computer laptops, central processors, and computer tablets.

7. The communications system of claim 1, wherein the processor receives additional information from a management interface system that (fill in with additional text to be added).

8. The communications system of claim 1, wherein the processor receives other additional information form a node service system that provides other additional information selected from a group consisting of global positioning system location and time information, (other to be filed to mirror list).

9. The communications system of claim 1, further comprising:
   a switching layer that receives instructions from the process to select the one or more of the two or more communications devices.

10. A method for robust communications, comprising:
    receiving information into one or more communication nodes;
    providing global positioning geographic location and time information to the one or more communication nodes;
    determining at the receiving node the most reliable communication from two or more communication paths at the one or more communication nodes a path passing through at least one additional node of the one or more communication nodes to a client network;

transmitting the information from the one or more nodes having received the information through the most reliable communication path; and receiving the information at the client network;

wherein the information comprises jamming detection.

11. The method of claim 10, further comprising:
determining a jammer location.

12. The method of claim 10, wherein the information is generated by a sensor.

13. The method of claim 10, wherein the information is transmitted from the one or more nodes having received the information by two or more communications devices selected from a group consisting of radio frequency radios, and optical communications devices.

14. The method of claim 10, further comprising:
providing additional information to the one or more communication nodes, wherein the additional information is selected from a group consisting of node processor updates.

15. The method of claim 10, wherein the client network is selected from a group consisting of a computer device, mobile phone and computer laptop.

16. The communications system of claim 2, wherein an angular range of each individual field of view is, 360 degrees divided by a total number of individual segmented antennas.

* * * * *